United States Patent
Chou et al.

(10) Patent No.: US 12,177,162 B2
(45) Date of Patent: Dec. 24, 2024

(54) PARTIAL SOUNDING METHOD FOR SOUNDING REFERENCE SIGNAL IN MOBILE COMMUNICATIONS

(71) Applicant: MEDIATEK INC., Hsin-Chu (TW)

(72) Inventors: Tzu-Han Chou, Hsin-Chu (TW); Cheng-Rung Tsai, Hsin-Chu (TW); Jiann-Ching Guey, Hsin-Chu (TW)

(73) Assignee: MEDIATEK Inc., Hsinchu (TW)

( * ) Notice: Subject to any disclaimer, the term of this patent is extended or adjusted under 35 U.S.C. 154(b) by 178 days.

(21) Appl. No.: 17/686,791

(22) Filed: Mar. 4, 2022

(65) Prior Publication Data

US 2022/0321312 A1 Oct. 6, 2022

Related U.S. Application Data

(60) Provisional application No. 63/171,126, filed on Apr. 6, 2021, provisional application No. 63/235,189, filed on Aug. 20, 2021.

(51) Int. Cl.
*H04L 5/00* (2006.01)

(52) U.S. Cl.
CPC .......... *H04L 5/0092* (2013.01); *H04L 5/0012* (2013.01); *H04L 5/0051* (2013.01)

(58) Field of Classification Search
CPC ... H04L 5/0048; H04L 5/0096; H04L 5/0032; H04L 5/0012; H04L 27/261; H04L 5/0051

See application file for complete search history.

(56) References Cited

U.S. PATENT DOCUMENTS

| | | | |
|---|---|---|---|
| 2019/0215110 A1 | 7/2019 | Yang et al. | H04L 5/00 |
| 2022/0271874 A1* | 8/2022 | Behravan | H04L 5/0051 |
| 2022/0353023 A1* | 11/2022 | Guthmann | H04L 1/1861 |
| 2023/0208592 A1* | 6/2023 | MolavianJazi | H04W 72/044 |
| | | | 370/336 |
| 2023/0239088 A1* | 7/2023 | Gao | H04L 5/0051 |
| | | | 370/329 |

FOREIGN PATENT DOCUMENTS

EP 3 099 119 B1 9/2018

OTHER PUBLICATIONS

China Intellectual Property Office Action 202210352809.5, dated Sep. 28, 2023 (7 pages).
Taiwan IPO, office action for the Taiwanese patent application 111112996 (no English translation is available), dated Jul. 18, 2022 (6 pages).

* cited by examiner

*Primary Examiner* — Shukri Taha
(74) *Attorney, Agent, or Firm* — Helen Mao; Zheng Jin; Imperium Patent Works

(57) ABSTRACT

A partial sounding method for sounding-reference-signal (SRS) is proposed. The network node may transmit higher-layer signal configuring a fractional SRS resource for partial sounding in configured resource blocks (RBs) to user equipment (UE). The UE may determine an SRS sequence length and a frequency-domain starting position of the fractional SRS resource based on the higher-layer signal to increase the SRS capacity.

16 Claims, 4 Drawing Sheets

PARTIAL SOUNDING METHOD FOR SOUNDING REFERENCE SIGNAL IN MOBILE COMMUNICATIONS

CROSS REFERENCE TO RELATED APPLICATIONS

This application claims priority under 35 U.S.C. § 119 from U.S. Provisional Application No. 63/171,126, entitled "SRS partial frequency sounding", filed on Apr. 6, 2021 and U.S. Provisional Application No. 63/235,189, entitled "SRS partial frequency hopping", filed on Aug. 20, 2021, the subject matter of which is incorporated herein by reference.

TECHNICAL FIELD

The disclosed embodiments relate generally to wireless communication, and, more particularly, to partial sounding method for sounding-reference-signal (SRS) in mobile communications.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new, radio (NR) systems.

In conventional mobile communications, in order to accommodate higher sounding-reference-signal (SRS) sounding demands for more users and more number of ports (e.g., antenna ports), how to increase system SRS capacity becomes more important.

SUMMARY

A partial sounding method for sounding-reference-signal (SRS) is proposed. The network node may transmit a higher-layer signal configuring a fractional SRS resource for partial sounding in configured resource blocks (RBs) to user equipment (UE). The UE may determine an SRS sequence length and a frequency-domain starting position of the fractional SRS resource based on the higher-layer signal to increase the SRS capacity.

In one embodiment, a user equipment (UE) receives a higher-layer signal configuring a fractional sounding-resource-signal (SRS) resource in configured resource blocks (RBs) from a network node, wherein the higher-layer signal comprises a scaling factor $P_F$. The UE determines an SRS sequence length and a frequency-domain starting position of the fractional SRS resource based on the higher-layer signal. The UE determines the fractional SRS resource according to the SRS sequence length and the frequency-domain starting position. The UE transmits an SRS to the network node on the fractional SRS resource.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
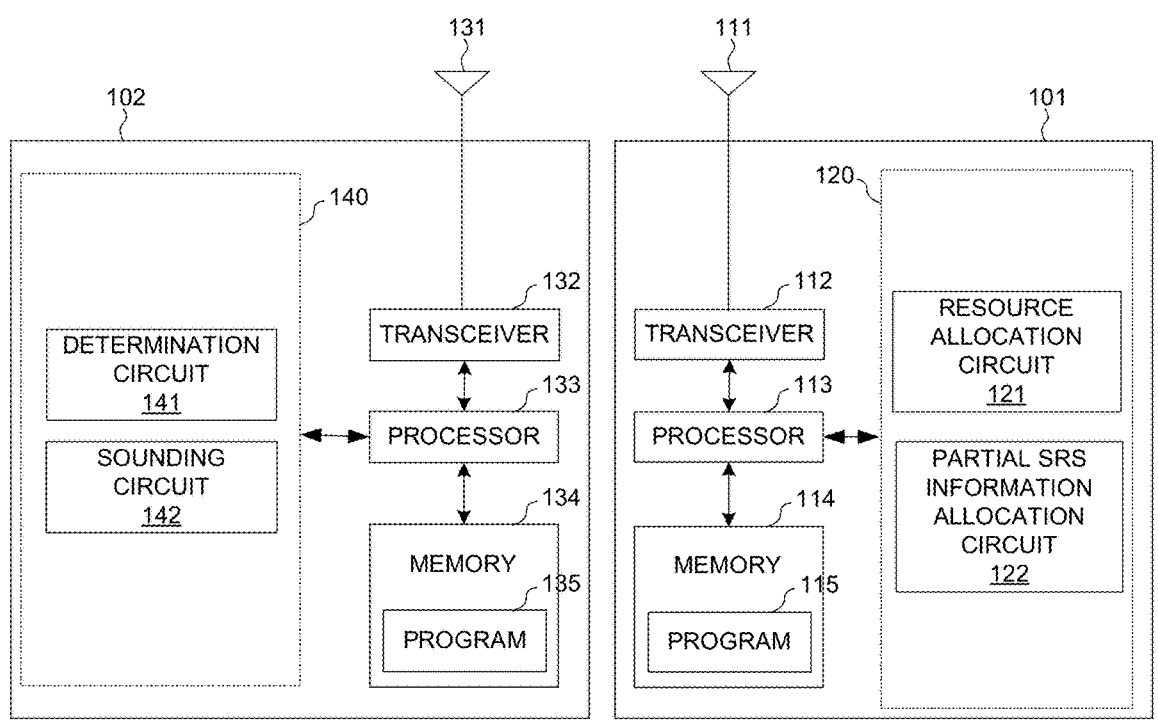
FIG. 1 is a simplified block diagram of a network node and a user equipment that carries out certain embodiments of the present invention.

FIG. 1 is a simplified block diagram of a network node and a user equipment (UE) that carries out certain embodiments of the present invention. The network node 101 may be a base station (BS) or a gNB, but the present invention should not be limited thereto. The UE 102 may be a smart phone, a wearable device, an Internet of Things (IoT) device, and a tablet, etc. Alternatively, UE 102 may be a Notebook (NB) or Personal Computer (PC) inserted or installed with a data card which includes a modem and RF transceiver(s) to provide the functionality of wireless communication.

Network node 101 has an antenna array 111 having multiple antenna elements that transmits and receives radio signals, one or more RF transceiver modules 112, coupled with the antenna array 111, receives RF signals from antenna array 111, converts them to baseband signal, and sends them to processor 113. RF transceiver 112 also converts received baseband signals from processor 113, converts them to RF signals, and sends out to antenna array 111. Processor 113 processes the received baseband signals and invokes different functional modules 120 to perform features in network node 101. Memory 114 stores program instructions and data 115 to control the operations of network node 101. Network node 101 also includes multiple function modules that carries out different tasks in accordance with embodiments of the current invention.

Similarly, UE 102 has an antenna array 131, which transmits and receives radio signals. A RF transceiver 132, coupled with the antenna, receives RF signals from antenna array 131, converts them to baseband signals and sends them to processor 133. RF transceiver 132 also converts received baseband signals from processor 133, converts them to RF signals, and sends out to antenna array 131. Processor 133 processes the received baseband signals and invokes different functional modules 140 to perform features in UE 102. Memory 134 stores program instructions and data 135 to control the operations of UE 102. UE 102 also includes multiple function modules and circuits that carries out different tasks in accordance with embodiments of the current invention.

The functional modules and circuits 120 and 140 can be implemented and configured by hardware, firmware, software, and any combination thereof. The function modules and circuits 120 and 140, when executed by the processors 113 and 133 (e.g., via executing program codes 115 and 135), allow network node 101 and UE 102 to perform embodiments of the present invention.

In the example of FIG. 1, the network node 101 may comprise a resource allocation circuit 121 and a partial sounding-resource-signal (SRS) information allocation circuit 122. Allocation circuit 121 may configure resource blocks (RBs) to the UE 102. Partial SRS information allocation circuit 122 may deliver a higher-layer signal which configures the information of partial sounding for the SRS in the configured RBs to the UE 102.

In the example of FIG. 1, the UE 102 may comprise a determination circuit 141 and a sounding circuit 142. Determination circuit 141 may determine an SRS sequence length and a frequency-domain starting position of a fractional SRS resource. Sounding circuit 142 may sound the fractional SRS resource based on the SRS sequence length and the frequency-domain starting position.

In accordance with one novel aspect, the network node 101 may transmit the higher-layer signal to the UE 102 through higher layer signaling. In an example, the network node 101 may transmit the higher-layer signal to the UE 102 through radio resource control (RRC) configuration. In an example, the higher-layer signal may be a RRC signal.

In accordance with one novel aspect, the higher-layer signal comprises a scaling factor $P_F$. When the UE 102 receives the higher-layer signal, the UE 102 may know that the configured SRS resource (i.e. the fractional SRS resource) occupies $$\frac{1}{P_F}$$

configured RBs based on the scaling factor $P_F$. Because the fractional SRS resource only occupies $$\frac{1}{P_F}$$

configured RBs, the SRS capacity can be increased correspondingly.

The higher-layer signal may further comprise an SRS bandwidth configuration index $C_{SRS}$ and an SRS bandwidth parameter $B_{SRS}$, wherein $C_{SRS} \in \{0, 1, \ldots, 63\}$ and $B_{SRS} \in \{0, 1, \ldots, 3\}$. Based on the SRS bandwidth configuration index $C_{SRS}$ and the SRS bandwidth parameter $B_{SRS}$, the UE 102 may select value of $m_{SRS,b}$ (b=$B_{SRS}$) from a predefined Table 1 as shown below. $m_{SRS,b}$ denotes the maximum bandwidth within a Bandwidth Part (BWP) that can be sounded by the configured fractional SRS resource. Specifically, when scaling factor $P_F=1$, the bandwidth within a BWP corresponds to SRS is $m_{SRS,b}$, and when the scaling factor $P_F$ is larger than 1, the bandwidth within a BWP corresponds to SRS is $$\frac{m_{SRS,b}}{P_F}.$$

For example, if configured SRS bandwidth configuration index $C_{SRS}=9$ and SRS bandwidth parameter $B_{SRS}=1$, the UE 102 may select $m_{SRS,b}=16$.

TABLE 1

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In addition, a resource block size parameter $N_{SC}^{SB}$, which determines a number of consecutive subcarriers of an RB in the frequency domain may be preset in the UE 102. The higher-layer signal may further comprise a comb number $K_{TC}$.

In accordance with one novel aspect, the UE 102 may determine the SRS sequence length of the fractional SRS resource based on $m_{SRS,b}$, $N_{sc}^{RB}$, $K_{TC}$, and the scaling factor $P_F$. The SRS sequence length of the fractional SRS resource can be determined by $$M_{sc,b}^{SRS} = m_{SRS,b} N_{sc}^{RB}/(K_{TC} P_F)$$

where $M_{sc,b}^{SRS}$ is the SRS sequence length of the fractional SRS resource.

In order to ensure performance, in accordance with one novel aspect, a restriction may be set on the configured parameters $m_{SRS,b}$, $K_{TC}$, and the scaling factor $P_F$. For example, the restriction may be $K_{TC} P_F \leq 2 m_{SRS,b}$ to ensure that the sequence length is not less than 6.

In accordance with one novel aspect, the higher-layer signal may further comprise one or more frequency hopping offset parameters. When the UE 102 determines the frequency-domain starting position of the fractional SRS resource, the frequency hopping offset parameters and the scaling factor $P_F$ will be concerned.

In accordance with one novel aspect, the frequency-domain starting position of the fractional SRS resource can be determined by $$k_0^{p_i} = \overline{k}_0^{p_i} + \sum_{b}^{B_{SRS}} K_{TC} M_{sc,b}^{SRS} n_b$$

where $k_0^{p_i}$ is the frequency-domain starting position of the fractional SRS resource for the antenna port $p_i$.

The first term $\overline{k}_0^{p_i}$ of $k_0^{p_i}$ denotes the location within a subband (i.e. the size of $m_{SRS,B_{SRS}}$ RBs), and can be determined by $$\overline{k}_0^{p_i} = \left( n_{shift} + \frac{(k_F + i'_{offset}) \bmod P_F}{P_F} m_{SRS,B_{SRS}} \right) N_{sc}^{RB} + (k_{TC}^{p_i} + k'_{offset}) \bmod K_{TC},$$

where $n_{shift}$ is a frequency domain shift value which is configured in the higher-layer signal to adjust the SRS location with respect to the reference point grid, $k_F \in \{0, 1, \ldots, P_F-1\}$ is a constant configured in the higher-layer signal for the initial starting position of the fractional SRS resource, $l' \in \{0, 1, \ldots, N_{symbol}-1\}$ is the SRS symbol index in a slot, where $N_{symbol}$ is the number of symbols in a slot, $i_{offset}^{l'}$ comprises the one or more frequency hopping offset parameters configured in the higher-layer signal, and $(k_{TC}^{p_i} + k'_{offset}^{l'}) \bmod K_{TC}$ is the offset function associated with antenna port $p_i$, the SRS symbol index l' and comb number $K_{TC}$.

The second term $\Sigma_b^{B_{SRS}} K_{TC} M_{sc,b}^{SRS} n_b$ of $k_0^{p_i}$ is associated with the sub-band (i.e. the size of $m_{SRS,B_{SRS}}$ RBs) frequency hopping. $n_b$ is frequency hopping index configured in the higher-layer signal. In addition, $n_b$ is a function of $n_{SRS}$ which is an incremental integer indicating index associated with the frequency hopping period. In the application, $\bmod(n_{SRS}, |T_{FH}|) \in \{0, \ldots, |T_{FH}|-1\}$ denotes a range of index for one frequency hopping period and $$n_{FH} = \left\lfloor \frac{n_{SRS}}{|T_{FH}|} \right\rfloor$$

denotes the index of frequency hopping period. In accordance with one novel aspect, each symbol within each frequency hopping period comprises the configured RBs. In addition, in each symbol, the fractional SRS resource occupies $$\frac{1}{P_F}$$

configured RBs.

In accordance with one novel aspect, the UE 102 may perform a frequency hopping in the fractional SRS resource according to the one or more frequency hopping offset parameters. In accordance with one novel aspect, the frequency hopping offset parameters comprise a first frequency hopping offset parameter $O_{l',R}$, and a second frequency hopping offset parameter $O_{FH}$. $l' \in \{0, 1, \ldots, N_{symbol}-1\}$ is the SRS symbol index in a slot, where $N_{symbol}$ is the number of symbols in a slot. R is the number of symbol repetitions. Base on the first frequency hopping offset parameter $O_{l',R}$, and the second frequency hopping offset parameter $O_{FH}$, $\overline{k}_0^{(p_i)}$ may be determined by $$\overline{k}_0^{(p_i)} = \left( n_{shift} + \frac{(k_F + O_{l',R} + O_{FH}) \bmod P_F}{P_F} m_{SRS,B_{SRS}} \right) N_{sc}^{RB} + (k_{TC}^{(p_i)} + k'_{offset}) \bmod K_{TC},$$

i.e. in the above formular $i_{offset}^{l'} = O_{l',R} + O_{FH}$.

The first frequency hopping offset parameter $O_{l',R}$, and the second frequency hopping offset parameter $O_{FH}$ can be concerned independently. The frequency hopping in the fractional SRS resource can be enabled or disabled based on the capability of UE 102 and the control of network node 101. The values of first frequency hopping offset parameter $O_{l',R}$, and second frequency hopping offset parameter $O_{FH}$ may be determined based on Table 2 as shown below.

TABLE 2

| $P_F$ | $O_{l',R}$ for $\bmod(\bmod(l', R), P_F) = 0, \ldots, P_F - 1$<br>$O_{FH}$ for $\bmod(n_{FH}, P_F) = 0, \ldots, P_F - 1$ |
|---|---|
| 2 | 0, 1 |
| 4 | 0, 2, 1, 3 |
| 8 | 0, 4, 2, 6, 1, 5, 3, 7 |

Figure 2:
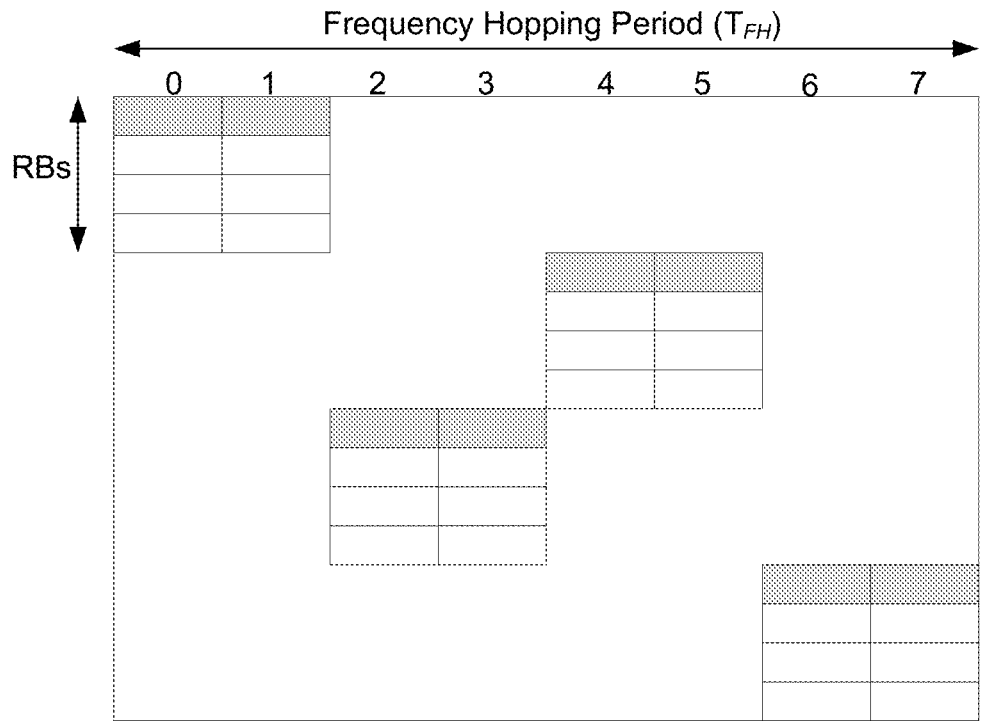
FIG. 2 illustrates an example of sounding in fractional SRS resource in repetitive symbols.
Figure 3:
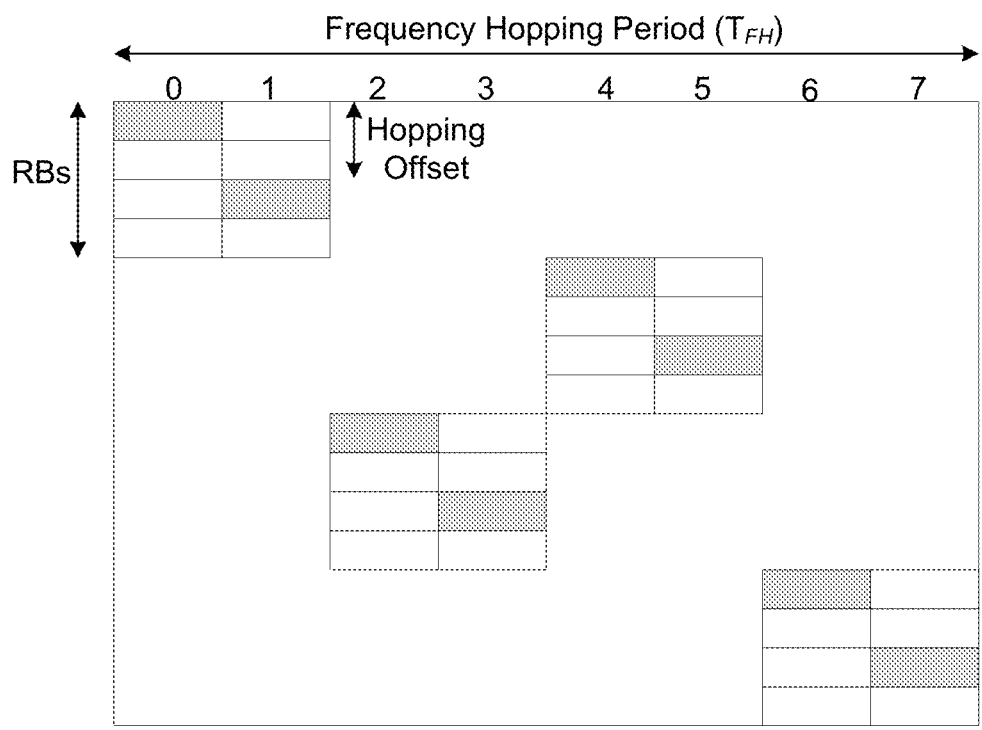
FIG. 3 illustrates an example of sounding in fractional SRS resource in repetitive symbols with frequency hopping.

In accordance with one novel aspect, the first frequency hopping offset parameter $O_{l',R}$ is applied in repeated symbols within a frequency hopping period $T_{FH}$ in an event that the fractional SRS resource is repeated to sound in the repeated symbols at the same frequency location in the frequency hopping period. In an embodiment, the UE 102 may sound the fractional SRS resource in a first symbol of the repeated symbols at a first sub-frequency location of the frequency location associated with the repeated symbols, and based on the first frequency hopping offset parameter $O_{l',R}$, the UE 102 may sound the fractional SRS resource in a second symbol of the repeated symbols at a second sub-frequency location of the frequency location associated with the repeated symbols. Taking FIG. 2 and FIG. 3 as an example, it is assumed that the configured scaling factor $P_F=4$ and the number of symbol repetitions R=2. As shown in FIG. 2 and FIG. 3, each configured fractional SRS resource occupies ¼ configured RBs. In FIG. 2, the frequency hopping in the fractional SRS resource of repeated symbols within the frequency hopping period $T_{FH}$ is disabled, the UE 102 may not perform frequency hopping in the fractional SRS resource. In FIG. 3, the frequency hopping in the fractional SRS resource of repeated symbols within the frequency hopping period $T_{FH}$ is enabled, the UE 102 may perform frequency hopping in the fractional SRS resource based on Table 2, i.e. $O_{l',R}=0$ when l' is even (symbol 0, symbol 2, symbol 4 and symbol 6), and $O_{l',R}=2$ when l' is odd (symbol 1, symbol 3, symbol 5 and symbol 7).

Figure 4:
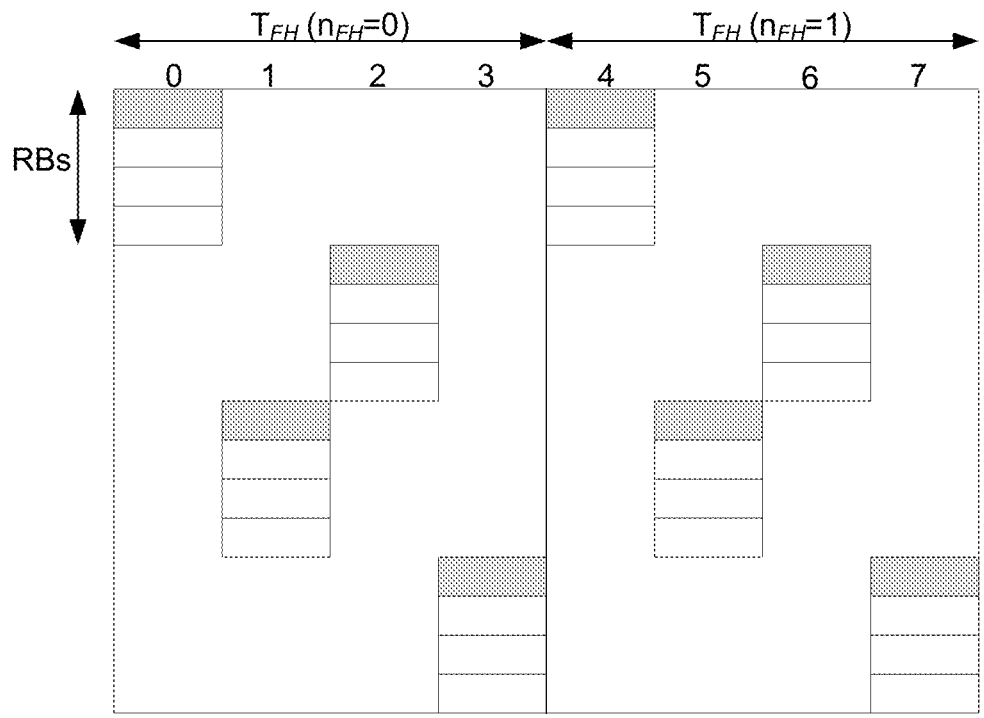
FIG. 4 illustrates an example of sounding in fractional SRS resource in different frequency hopping periods.
Figure 5:
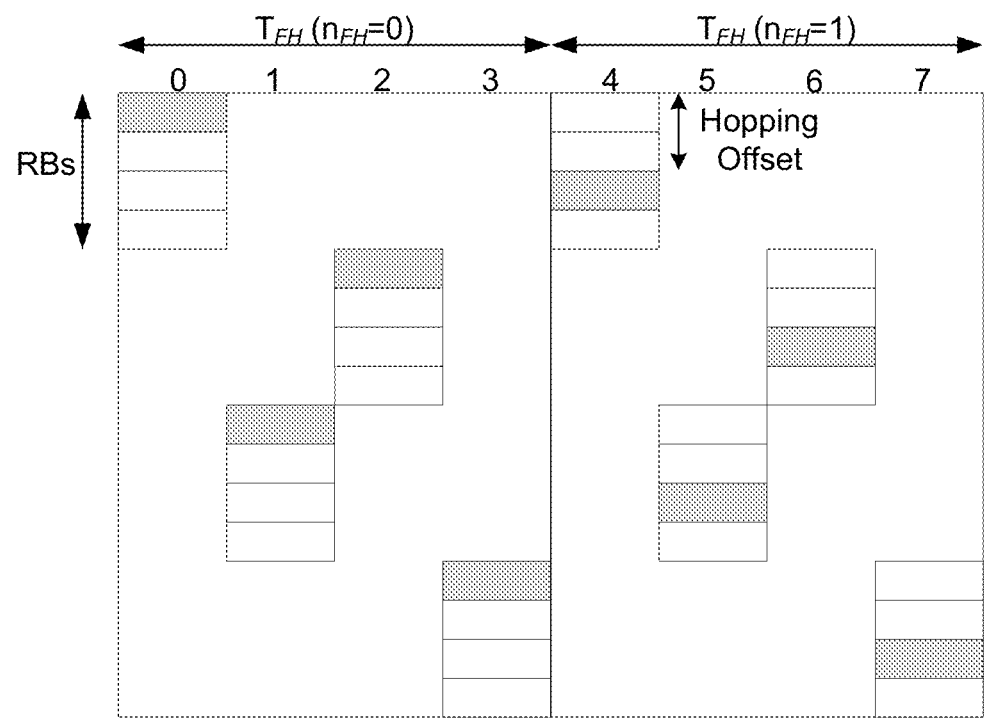
FIG. 5 illustrates an example of sounding in fractional SRS resource in different frequency hopping periods with frequency hopping.

In accordance with one novel aspect, the second frequency hopping offset parameter $O_{FH}$ is applied in different continuous frequency hopping periods (e.g. $T_{FH}$ ($n_{FH}=0$) and $T_{FH}$ ($n_{FH}=1$) as shown in FIG. 4 and FIG. 5) in an event that the fractional SRS resource is repeated to sound at the same frequency locations in the different frequency hopping periods. In an embodiment, the UE 102 may sound the fractional SRS resource in each symbol of a first frequency hopping period at a first sub-frequency location of each symbol in the first frequency hopping period, and based on the second frequency hopping offset parameter $O_{FH}$, the UE 102 may sound the fractional SRS resource in each symbol of a second frequency hopping period at a second sub-frequency location of each symbol in the second frequency hopping period, wherein the first frequency hopping period and the second frequency hopping period are continuous. Taking FIG. 4 and FIG. 5 as an example, it is assumed that the configured scaling factor $P_F=4$ and the number of symbol repetitions R=1. As shown in FIG. 4 and FIG. 5, each configured fractional SRS resource occupies ¼ configured RBs. In FIG. 4, the frequency hopping in the fractional SRS resource of frequency hopping period $T_{FH}$ ($n_{FH}=0$) and frequency hopping period $T_{FH}(n_{FH}=1)$ is disabled, the UE 102 may not perform frequency hopping in the fractional SRS resource. In FIG. 5, the frequency hopping in the fractional SRS resource of frequency hopping period $T_{FH}(n_{FH}=0)$ and frequency hopping period $T_{FH}(n_{FH}=1)$ is enabled, the UE 102 may perform frequency hopping in the fractional SRS resource based on Table 2, i.e. $O_{FH}=0$ in frequency hopping period $T_{FH}$ ($n_{FH}=$, and $O_{FH}=2$ in frequency hopping period $T_{FH}$ ($n_{FH}=1$).

In accordance with one novel aspect, when the UE 102 determines the SRS sequence length and the frequency-domain starting position of the fractional SRS resource, the UE 102 may determine the fractional SRS resource according to the SRS sequence length and the frequency-domain starting position. The UE 102 may transmit an SRS to the network node 101 on the fractional SRS resource.

Figure 6:
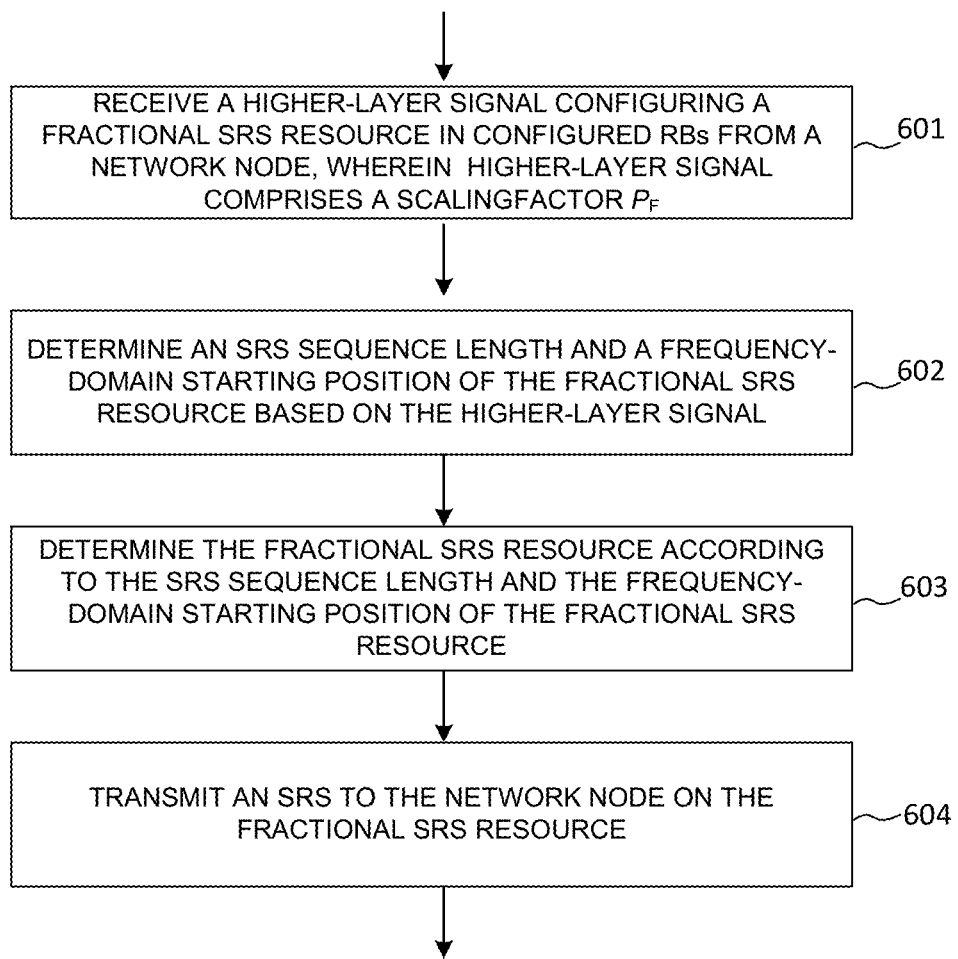
FIG. 6 is a flow chart of a partial sounding method for SRS in accordance with one novel aspect.

FIG. 6 is a flow chart of a partial sounding method for sounding-reference-signal (SRS) in accordance with one novel aspect. In step 601, the UE 102 receives a higher-layer signal configuring a fractional SRS resource in configured resource blocks (RBs) from the network node 101, wherein the higher-layer signal comprises a scaling factor $P_F$.

In step 602, the UE 102 determines an SRS sequence length and a frequency-domain starting position of the fractional SRS resource based on the higher-layer signal.

In step 603, the UE 102 determines the fractional SRS resource according to the SRS sequence length and the frequency-domain starting position.

In step 604, the UE 102 transmits an SRS to the network node on the fractional SRS resource.

In accordance with one novel aspect, the fractional SRS resource occupies $$\frac{1}{P_F}$$

configured RBs.

In accordance with one novel aspect, the higher-layer signal further comprises one or more frequency hopping offset parameters. In the partial sounding method, the UE 102 may perform a frequency hopping in the fractional SRS resource according to the one or more frequency hopping offset parameters.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a user equipment (UE), a higher-layer signal configuring a fractional sounding-resource-signal (SRS) resource in configured resource blocks (RBs) from a network node, wherein the higher-layer signal comprises a scaling factor $P_F$;
   determining, by the UE, an SRS sequence length and a frequency-domain starting position of the fractional SRS resource based on the higher-layer signal; determining, by the UE, the fractional SRS resource according to the SRS sequence length and the frequency-domain starting position;
   performing, by the UE, a frequency hopping in the fractional SRS resource according to a frequency hopping offset parameter, wherein the frequency hopping offset parameter is applied in repeated symbols within a frequency hopping period in an event that the fractional SRS resource is repeated to sound in the repeated symbols at the same frequency location in the frequency hopping period or in different frequency hopping periods in an event that the fractional SRS resource is repeated to sound at the same frequency locations in the different frequency hopping period; and
   transmitting, by the UE, an SRS to the network node on the fractional SRS resource.

2. The method of claim 1, wherein the fractional SRS resource occupies $$\frac{1}{P_F}$$

configured RBs.

3. The method of claim 2, wherein each symbol within each frequency hopping period comprises the configured RBs and in each symbol, the fractional SRS resource occupies $$\frac{1}{P_F}$$

configured RBs.

4. The method of claim 3, wherein the higher-layer signal further comprises one or more frequency hopping offset parameters.

5. The method of claim 4, further comprising:
   performing, by the UE, a frequency hopping in the fractional SRS resource according to the one or more frequency hopping offset parameters.

6. The method of claim 1, further comprising:
sounding, by the UE, the fractional SRS resource in a first symbol of the repeated symbols at a first sub-frequency location of the frequency location associated with the repeated symbols; and
sounding, by the UE based on the first frequency hopping offset parameter, the fractional SRS resource in a second symbol of the repeated symbols at a second sub-frequency location of the frequency location associated with the repeated symbols.

7. The method of claim 1, further comprising:
sounding, by the UE, the fractional SRS resource in each symbol of a first frequency hopping period at a first sub-frequency location of each symbol in the first frequency hopping period; and
sounding, by the UE based on the second frequency hopping offset parameter, the fractional SRS resource in each symbol of a second frequency hopping period at a second sub-frequency location of each symbol in the second frequency hopping period, wherein the first frequency hopping period and the second frequency hopping period are continuous.

8. The method of claim 1, wherein the higher-layer signal comprises a radio resource control (RRC) signal.

9. A user equipment (UE), comprising:
a receiver that receives a higher-layer signal configuring a fractional sounding-resource-signal (SRS) resource in configured resource blocks (RBs) from a network node, wherein the higher-layer signal comprises a scaling factor $P_F$;
a processor that determines an SRS sequence length and a frequency-domain starting position of the fractional SRS resource based on the higher-layer signal and determines the fractional SRS resource according to the SRS sequence length and the frequency-domain starting position and performs a frequency hopping in the fractional SRS resource according to a frequency hopping offset parameter, wherein the frequency hopping offset parameter is applied in repeated symbols within a frequency hopping period in an event that the fractional SRS resource is repeated to sound in the repeated symbols at the same frequency location in the frequency hopping period or in different frequency hopping periods in an event that the fractional SRS resource is repeated to sound at the same frequency locations in the different frequency hopping periods,
a transmitter that transmits an SRS to the network node on the fractional SRS resource.

10. The UE of claim 9, wherein the fractional SRS resource occupies $$\frac{1}{P_F}$$

configured RBs.

11. The UE of claim 10, wherein each symbol within each frequency hopping period comprises the configured RBs and in each symbol, the fractional SRS resource occupies $$\frac{1}{P_F}$$

configured RBs.

12. The UE of claim 11, wherein the higher-layer signal further comprises one or more frequency hopping offset parameters.

13. The UE of claim 12, wherein the processor performs a frequency hopping in the fractional SRS resource according to the one or more frequency hopping offset parameters.

14. The VE of claim 9, wherein the processor sounds the fractional SRS resource in a first symbol of the repeated symbols at a first sub-frequency location of the frequency location associated with the repeated symbols, and based on the first frequency hopping offset parameter, the processor sounds the fractional SRS resource in a second symbol of the repeated symbols at a second sub-frequency location of the frequency location associated with the repeated symbols.

15. The VE of claim 9, wherein the processor sounds the fractional SRS resource in each symbol of a first frequency hopping period at a first sub-frequency location of each symbol in the first frequency hopping period, and
based on the second frequency hopping offset parameter, the processor sounds the fractional SRS resource in each symbol of a second frequency hopping period at a second sub-frequency location of each symbol in the second frequency hopping period, wherein the first frequency hopping period and the second frequency hopping period are continuous.

16. The UE of claim 9, wherein the higher-layer signal comprises a radio resource control (RRC) signal.

* * * * *